United States Patent [19]

Wilson

[11] 4,028,987
[45] June 14, 1977

[54] SELF-DRILLING SCREWS

[75] Inventor: Robert Neil Wilson, Surrey Hills, Australia

[73] Assignee: Illinois Tool Works Inc., Chicago, Ill.

[22] Filed: Dec. 5, 1975

[21] Appl. No.: 638,220

Related U.S. Application Data

[63] Continuation of Ser. No. 485,475, July 3, 1974, abandoned.

[52] U.S. Cl. .................................. 85/46; 85/47; 408/224
[51] Int. Cl.² .................................. F16B 25/00
[58] Field of Search .............. 85/41, 46, 47, 48; 10/140; 408/224, 223, 225, 230

[56] References Cited

UNITED STATES PATENTS

| 1,408,793 | 3/1922 | Anderson et al. ............... 85/47 X |
| 1,418,485 | 6/1922 | Smith ............................. 408/224 |
| 2,388,482 | 11/1945 | Haynes ............................ 85/47 |
| 2,543,206 | 2/1951 | Smith ............................. 408/224 |
| 3,125,923 | 3/1964 | Hanneman ........................ 85/47 |
| 3,195,156 | 7/1965 | Phipard .......................... 85/47 X |
| 3,241,426 | 3/1966 | Gutshall ......................... 85/47 |
| 3,318,182 | 5/1967 | Carlson .......................... 85/48 X |
| 3,395,603 | 8/1968 | Skierski ......................... 85/47 |
| 3,578,762 | 5/1971 | Siebol et al. .................... 85/41 |
| 3,827,331 | 8/1974 | Muenchinger ..................... 85/41 |

FOREIGN PATENTS OR APPLICATIONS

| 696,358 | 10/1964 | Canada ........................... 85/41 |
| 2,015,983 | 10/1971 | Germany ......................... 408/224 |
| 167,620 | 8/1921 | United Kingdom ................. 85/41 |

Primary Examiner—Roy D. Frazier
Assistant Examiner—Thomas J. Holko
Attorney, Agent, or Firm—Thomas W. Buckman; Robert W. Beart

[57] ABSTRACT

A self-drilling thread-forming screw having a first portion which is screw-threaded and adapted to form a screw-thread in the material within which the screw is to be engaged, a head at one end of the first portion, and at the other end of the first portion a second portion of generally smaller cross-sectional size than the first portion and having a drill point at the entering end thereof, and a pair of diametrally opposed wings outstanding from the second portion and each tapering inwardly towards the first portion from a front cutting edge.

5 Claims, 5 Drawing Figures

U.S. Patent   June 14, 1977   4,028,987
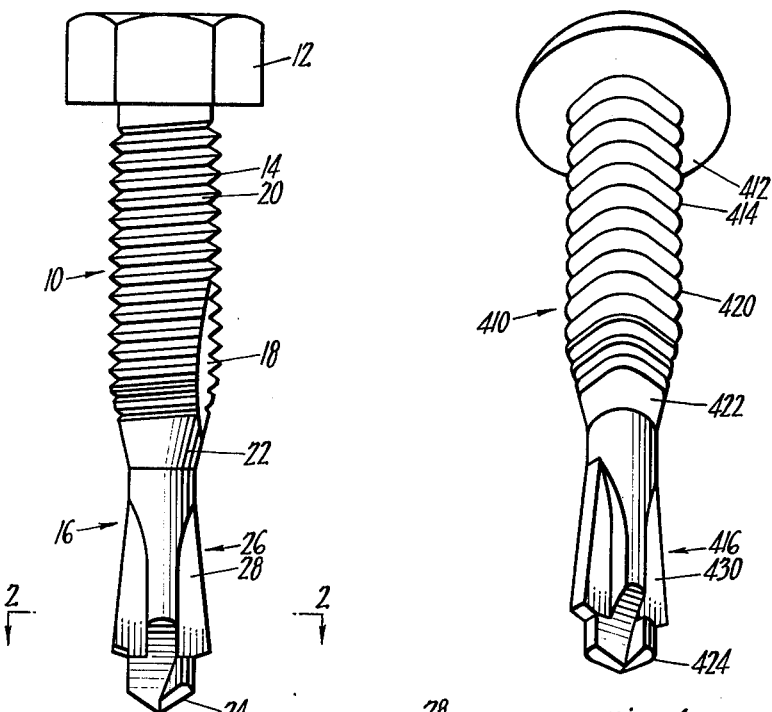
Fig. 1.
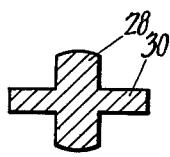
Fig. 2.
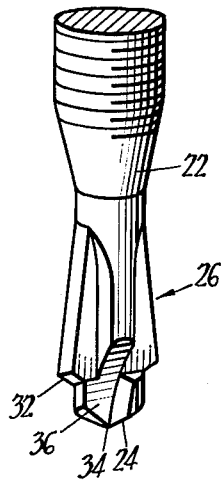
Fig. 3.
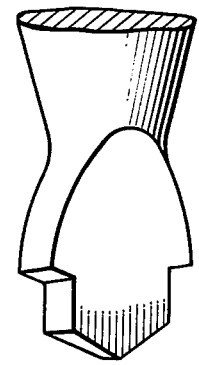
Fig. 4.
Fig. 5.

SELF-DRILLING SCREWS

This is a continuation, application Ser. No. 485,475, filed July 3, 1974.

This invention relates to self-drilling screws and it refers particularly, but not exclusively, to self-drilling screws of the thread cutting type.

Hitherto, most self-drilling screws have been manufactured by machining or forging a point — similar to that of a twist drill — onto a headed wire blank which is essentially parallel and of the same diameter or cross-sectional size and shape from the drilling point to the underneath side of the head. The wire blank has been threaded for a part of the length of the screw, usually by thread rolling. Such screws have several disadvantages. As the hole produced by the drill point is slightly larger than the wire diameter and the root diameter of the thread is slightly smaller than the wire diameter, a full depth thread cannot be achieved. Further, the thickness of metal which can be drilled by the point of such self-drilling screws is proportional to the length of the flute of the drilling point as the flute provides the means for removing the chips or swarf produced by the drilling action. Once the end of the flute drips below the top surface of the material being drilled, unless the point of the self-drilling screw has penetrated through the bottom surface of the material being drilled no further chips or sward can be removed, resulting in the cessation of the drilling action and possible destruction of the drilling point due to the generated heat.

Due to limitations in current manufacturing methods and equipment, the largest diameter screw which can currently be manufactured is approximately a quarter of an inch in diameter. Further, it is not possible to manufacture self-drilling thread rolling screws.

The object of the present invention is to overcome the above mentioned disadvantages and to provide a self-drilling screw of improved construction and an improved method of manufacturing self-drilling screws.

A further object is to provide self-drilling screws which may be made so as to be thread rolling and not thread cutting screws; to provide self-drilling screws of which the thread forming and threaded portion is of non-circular cross-section.

With the above objects in mind, the present invention provides a method of making a self-drilling screw including the step of forming a wire blank having along its length at least two portions of different cross-sectional size or thickness, a first portion of greater cross-sectional size being adapted to have formed thereon screw-threads and/or a thread forming part and of a length determined by the length of screw-thread required, and a second portion of lesser cross-sectional size being adapted to have formed thereon drilling means, the length of the second portion being dependent on the desired depth of penetration.

The invention also provides a self-drilling thread-forming screw having a first portion which is screw-threaded and adapted to form a screw-thread in material within which the screw is engaged, a head at one end of the first portion, and at the other end of the first portion a tapered portion connecting the first portion to a second portion of generally smaller cross-sectional size than the first portion and having hole-forming means.

It is preferred that the hole-forming means forms a hole of a diameter substantially that of the root diameter of the screw-thread to be formed by the screw-thread forming means of the first portion.

Further it is preferred that the hole-forming means of the second portion forms a hole of desired diameter in two stages, there being a drill point at the entering end of the screw and secondary cutter means behind the drill point for removing additional material and enlarging the hole formed by the drill point.

If desired the drill point may be provided with a small projection to be used as a centre-pop.

In order that the invention may be clearly understood and readily put into practical effect there shall now be described, with reference to the accompanying illustrative drawings, preferred constructions of a self-drilling screw made according to the invention. In these drawings:

FIG. 1 is a side elevation of a first embodiment of a self-drilling screw;

FIG. 2 is a cross-section on the plane 2—2 of FIG. 1;

FIG. 3 is a side view of the hole-forming means of the screw of FIG. 1;

FIG. 4 is a perspective view of a second embodiment of a self-drilling screw; and FIG. 5 is an enlarged view of a second embodiment of a hole-forming means.

FIGS. 1, 2 and 3 show a screw 10 having at one end a screw head 12 of desired shape and size — such as the illustrated hexagonal head of required standard portions. Extending from the head so as to be co-axial therewith is a shank 14 basically of substantially circular cross-sectional shape and having in its length a screw-thread 20 and, at the end of the shank remote from the head 12 a cut or gash 18 of suitable shape and size to provide thread-cutting means.

Extending co-axially from the shank 14 in a direction away from the head 12 is a second portion 16 of somewhat smaller cross-sectional diameter than the root diameter of the screw-threaded shank 14, there being an intermediate portion 22 tapering from the crest of the screw-threads 20 to the second portion 16, part of the tapered intermediate portion 22 being plain and part screw-threaded. At the outer end of the second portion 16 there is a drill point 24 of the design as provided in the self-drilling not thread-cutting screws known by the registered trade mark TEKS. The drill point 24 will form a hole of diameter smaller than the root diameter of the screw-threaded shank 14.

Between the drill point 24 and the tapered intermediate portion 22 of the screw 10 there is a formation 26 of somewhat cross-shape having two opposed shorter arms 28 and two opposed longer arms or wings 30 at right angles thereto. The overall dimension across the extremities or outer surfaces of the shorter arms 28 is substantially the same as the basic diameter of the second portion 16 of the screw.

The longer arms of wings 30 taper from the front ends 32 towards the back at a suitable clearance angle, being thus of greater overall dimension across their outer surfaces at the end close to the drill point 24 than at the end close to the tapered intermediate portion 22 of the screw 10, and the cross-shaped part 26 merges into the circular shape of the second portion 16 of the screw a short distance forward of the intermediate portion 22. The front ends 32 of said longer arms or wings 30 are located between the tip of the drill front 34 and the rear ends of the flutes 36 of the conventional twist drill type point 24 and are formed to provide a suitable cutting action, being therefore at a suitable cutting angle.

When using the screw made according to the invention and as particularly described above, the drill point 24 will enter the material in which the screw is to be engaged and will form an entering hole. Then the ends 32 of the two wings 30 will engage the material and enlarge the hole, permitting free escape of swarf or chips between the longer arms 30 and the shorter arms 28 as the drill point 24 penetrates further, the size of the enlarged hole being such as will enable a screw thread to be cut with the formation of a substantially full screw thread. It is believed that the depth of screwthread which may be formed conveniently by use of this thread-forming screw 10 will be greater than has hitherto been conveniently possible.

If desired, the cross-sectional shape of the shank portion may be non-circular, such as "tri-lobular", so that the thread-forming portion of the screw may be of the same type as that of the screws known by the trade mark "TapTite", as is illustrated in FIG. 4 wherein the prefix number 4 is used, similar parts having otherwise the same numbers as used in FIGS. 1 to 3.

In the construction shown in FIG. 4, there is provided a self-drilling thread-rolling screw 410 having a head 412, a shank 414, a tapering intermediate portion 422 and hole-forming means 416.

The shank 414 may be screw-threaded for its full length as shown or for a part only, and the cross-sectional shape of the shank 414 will depend on the type of thread-forming — that is, whether thread cutting or thread rolling. In the latter case the cut or gash is not required at the end of the shank 414 adjacent the tapering intermediate portion 422.

The length of the second portion 416 of the screw, having the drill point 424, depends upon the total thickness of the material to be penetrated. By reason of the provision of the cutting wings 430 that thickness will be greater than has hitherto been possible because the swarf or chips can now escape freely. Also the wings 430 provide for greater accuracy in the formation of the final hole. The second portion 416 of the screw may be of any suitable basic cross-sectional shape, such as round, elliptical, square or other shape compatible with the design of the drill point 424. The wings 430 may be made to provide a hole of substantially the same diameter as that at the root of the threads 420, or a little larger or substantially larger, as required.

Other drill point configuration may be utilised as, for example, a fly cutter, as is illustrated in FIG. 5. This would be particularly useful when using the screw in conjunction with considerably softer materials such as, for example, wood.

The screw is preferably made of a material which is harder than the material into which it is to be driven, or it may be hardened, as by heat treatment locally or all over or of a material which will work harden.

The screw may be made by forging operations, or by machining operations or by a combination thereof such as by forging the blank and front end of the screw and thread-rolling the shank.

There may be provided a projection or bun at the tip of drill point 34 (FIG. 3) in order to remove the requirement for a centre-pop when using the screw in hard materials, such as metals.

It is to be understood that modifications may be made in the design of the screw — as by changing the design of the drill point — and/or in the manner of manufacture thereof without departing from the ambit of the invention the nature of which is to be ascertained from the following claims.

What I claim is:

1. A self-drilling thread forming screw having first and second shank portions, a head at one extremity adjacent the first portion and a drill tip at the other extremity adjacent the second portion, the first portion being of greater cross-sectional size than the second portion, the first portion including thead convolutions formed thereon and including means to form complementary threads in the material within which the screw is to be engaged, the drill tip including a pilot drill portion having laterally extending cutting edges with a maximum transverse dimension not greater than the maximum transverse dimension of the second shank portion and flute regions extending generally longitudinally of the second shank portion from the laterally extending cutting edges, the second shank portion being generally cruciform in cross-sectional configuration, such a configuration being formed by wing portions terminating in secondary cutting edges extending transverse the axis of the fastener intermediate the pilot tip cutting edges and the first shank portion and further including arm portions extending in a plane generally perpendicular to the plane including the wing portions and in substantial axial alignment with the plane including the lateral cutting edges of the pilot drill, the extremities of the arms adjacent the drill portion terminating above the secondary cutting edges and merging with the uppermost extremity of the flute regions of the pilot drill so that the material removed by the drilling action of the pilot point may flow unimpeded into the region above the secondary cutting edges, the transverse dimension of the arm portions being less than the transverse dimension of the secondary cutting edges, the secondary cutting edges having a transverse dimension greater than that of the pilot cutting edges and substantially equal to the root diameter of the thread convolutions, a tapered shank portion interconnecting the first shank portion and second shank portion, the wing portions tapering outwardly from a position beneath the tapered shank portion toward the secondary cutting edges and thereby providing a clearance angle above said secondary cutting edges.

2. A screw as claimed in claim 1 wherein the screw is of the thread rolling type, at least a portion of the length thereof being of non-circular cross-section.

3. A screw as claimed in claim 2 wherein the non-circular cross-section is tri-lobular.

4. A screw as claimed in claim 1 wherein the tapering portion tapers from the crests of the screw-threads on the first portion and is partly screw-threaded.

5. A screw as claimed in claim 1 wherein the screw is of the thread cutting type and is provided with a gash extending from the first portion into the tapering portion.

* * * * *